US005202177A

United States Patent [19]

Kämper

[11] Patent Number: 5,202,177

[45] Date of Patent: Apr. 13, 1993

[54] TEAR WEBBING

[75] Inventor: Hans-Werner Kämper, Würselen, Fed. Rep. of Germany

[73] Assignee: Spanset Inter AG, Oetwil am See, Switzerland

[21] Appl. No.: 626,846

[22] Filed: Dec. 13, 1990

[30] Foreign Application Priority Data

Dec. 14, 1989 [DE] Fed. Rep. of Germany ....... 3941305

[51] Int. Cl.[5] .................................... B32B 7/00

[52] U.S. Cl. .................................... 428/257; 427/389.9; 428/252; 428/902

[58] Field of Search ............... 428/378, 236, 243, 252, 428/257, 902; 244/143, 151 R, 151 A, 151 B; 427/389.9

[56] References Cited

U.S. PATENT DOCUMENTS

| | | | |
|---|---|---|---|
| 2,422,440 | 4/1945 | Severance | 244/151 R |
| 2,452,228 | 10/1948 | Dawes et al. | 244/151 R |
| 2,471,166 | 5/1949 | Neff | 244/151 R |
| 3,897,920 | 8/1975 | Giovanniantonio | 244/110 C |

FOREIGN PATENT DOCUMENTS

| | | |
|---|---|---|
| 0728170 | 6/1932 | France . |

*Primary Examiner*—James J. Bell

*Attorney, Agent, or Firm*—Spencer, Frank & Schneider

[57] ABSTRACT

A tear webbing includes two woven straps each having a first length portion and an adjoining second length portion. The woven straps are, along the first length portion, in a parallel, superposed orientation and in a face-to-face engagement with one another and a binding yarn connects the woven straps to one another along the first length portion. The woven straps which are separate from one another along the second length portion are adapted to be exposed, in the second length portion, to pulling forces causing a progressive separation of the woven straps along the first length portion under an irreversible energy absorption. The tear webbing further includes an elastic coating matrix in which the woven straps are at least partially embedded along the first length portion.

11 Claims, 1 Drawing Sheet

TEAR WEBBING

CROSS REFERENCE TO RELATED APPLICATION

This application claims the priority of Federal Republic of Germany Application No. P 39 41 305.5 filed Dec. 14th, 1989, which is incorporated herein by reference.

BACKGROUND OF THE INVENTION

The invention relates to a tear webbing including two fabric straps superposed face-to-face along a partial length $1_T$ and woven or sewn together by a binding yarn. Pulling forces applied to the unconnected strap ends are introducible to the contact region, resulting in a progressive tearing (separation) of the strap connection while an irreversible energy absorption takes place. The two fabric straps can be interwoven directly during the weaving process or can be sewn together subsequent to being manufactured separately.

Tear webbing of the type mentioned above lend themselves to a variety of applications. In general they can be used anywhere where shock is to be absorbed, and moving masses of bodies must be stopped or decelerated in a controlled manner. Examples of use for tear webbings are parachute harnesses or crash safety harnesses for persons exposed to danger such as window cleaners, roofers or mountain climbers. If such a person is caught by a safety strap which is attached to a tear webbing as outlined above, the fall is not stopped abruptly, which could lead to considerable injuries, but is more gradually decelerated because a progressive tearing of the tear webbing irreversibly absorbs the kinetic energy of the fall. Compared with elastic safety belts, these tear webbings, consequently, have the additional advantage that they lack a rebound effect.

Tear webbings of the above type are known, for example, from U.S. Pat. No. 3,978,894, or, without binding yarns between the fabric strips, from U.S. Pat. No. 3,804,698. These tear webbings are used in parachute harnesses. In the tear webbing according to U.S. Pat. No. 3,978,894, two superimposed fabric straps are woven together by means of a plurality of binding yarns. Due to opposing tensile forces which attack the unconnected ends of the fabric straps and which are transverse to the plane of the fabric straps, the connection of the straps can be progressively torn in the longitudinal direction, thus resulting in an irreversible energy absorption.

In the tear webbing according to U.S. Pat. No. 3,804,698, three fabric straps are superposed face-to-face over a portion of their length. The connecting region is produced by a meandering (looped) positioning of one of the straps. Due to the tensile forces acting on the plane of the strap ends, the connecting region tears progressively in the longitudinal direction under irreversible energy absorption. The tear webbing according to U.S. Pat. No. 3,804,698 is held together by an adhesive rather than by binding yarns between the fabric straps.

The energy absorption which can be obtained basically depends on the strength of the woven structure of the fabric straps and the stability and density of the binding yarn connecting the two fabric straps. In order to increase the absorbable energy, the fabric straps and their connection are currently dimensioned to be stronger which can be effected by the use of stronger and more durable weaving yarn as well as by an enlargement of the fabric strap itself and its tearable connection.

SUMMARY OF THE INVENTION

It is an object of the invention to provide an improved tear webbing which is capable of absorbing more energy without a change in the woven structure of the fabric straps or their interconnection.

This object and others to become apparent as the specification progresses, are accomplished by the invention, according to which, briefly stated, the tear webbing is, along the superpositioned, face-to-face engaging length portion, reinforced by impregnation (saturation) with a coating material which, after impregnation, hardens to an elastic mass constituted by a coating matrix entirely or partially surrounding the woven fabric straps and binding yarns.

With the use of a suitable coating agent, by this measure it is possible to increase the tearing resistance of the tear webbing by 40% with the coating alone. Additionally, the tear webbing is protected by this coating, in a manner known by itself, against wear, abrasion, weather or the effect of corrosive chemicals. For an arrangement of the fabric straps in their mutual contact region a solution from the earlier-mentioned U.S. Patents may be selected.

According to a further feature of the invention, the coating agent is a paste which comprises a thermoplastic synthetic material. In comparison with a liquid for saturation, the paste has the advantage of comprising a greater proportion per unit volume of the plastic material which forms the coating matrix. As a result, a particularly good reinforcing effect can be obtained.

According to a further feature of the invention, the paste comprises a mixture of PVC plastic and a softener. For reasons of homogeneity of the paste, the PVC plastic is preferably mixed as a powder with the softener.

According to another feature of the invention, the coating agent paste is formed from a polyurethane and water dispersion to which a thickener is added to obtain a pasty consistency.

The PVC and polyurethane plastic material, the softener, and the thickener are each substances that are generally known for coating fabric straps and are commonly used. It is also conceivable to select by way of conducting coating experiments, other materials, for example, modified silicon, from a plurality of plastic materials having suitable coating and reinforcing characteristics.

In a method of making the reinforced tear webbing according to the present invention, a layer of the pasty coating agent is applied to the tear webbing and then the applied layer is pressed into the woven structure by applying pressure in the contact region of the tear webbing, subsequent to which the coating agent hardens elastically. Due to the pressing of the coating material into the woven structure and its elastic hardening, the coating matrix surrounding the fabric straps and the binding yarn is formed, which is responsible for the increase in tear strength while the web structure and the connection between the fabric straps remain the same.

According to a further feature of the method, the coating agent is applied by dipping the tear webbing into the coating agent paste. The pasty consistency ensures that dipping alone will provide a sufficiently large amount of paste of the coating agent to penetrate the tear webbing. The coating agent, however, due to its pasty consistency, penetrates only very slowly—if at all—by itself into the woven structure. Therefore, according to a further feature of the invention, the paste is forced into the woven structure of the tear webbing by a roller.

According to a further feature of the method, after the coating agent is pressed into the webbing, the tear webbing is heated above the softening temperature of the thermoplastic for evening the coating agent and for expelling any dispersion agent. As a result, there is obtained a coating agent matrix which surrounds the tear webbing uniformly and fills all intermediate spaces in the woven structure and achieves a superior reinforcing effect.

Thereafter, according to still another feature of the invention, the tear webbing is cooled for achieving an accelerated and improved resilient hardening of the thermoplastic material.

DESCRIPTION OF THE PREFERRED EMBODIMENT

Figure 2:
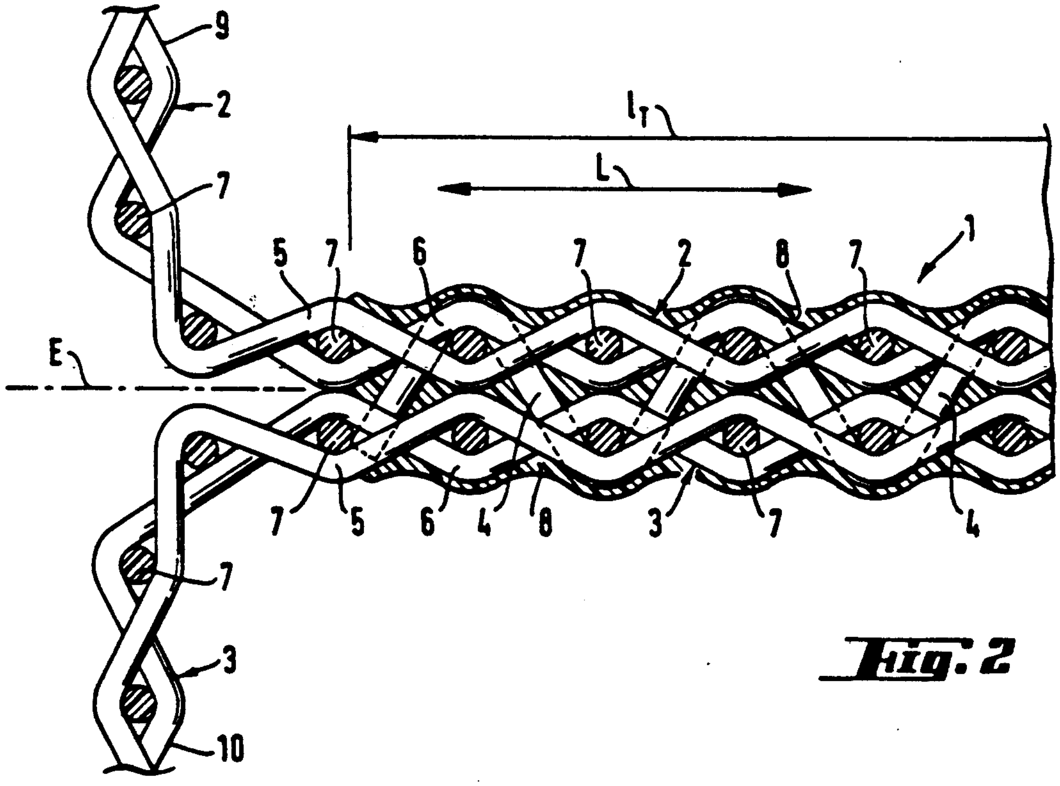
FIG. 2 is an enlarged schematic sectional view of a preferred embodiment of the invention.

Turning first to FIG. 2, the tear webbing 1 according to the invention comprises two woven fabric straps 2, 3 which, along a length portion $1_T$, extend in a parallel, superimposed, face-to-face relationship. The straps 2, 3 each have warp yarns 5, 6 and weft yarns 7. In the mutual contact region the two fabric straps 2, 3 are interwoven by means of one or more binding yarns 4. Fabric straps 2, 3 are conventional, strong, fabric straps which may be woven from the most diverse fiber materials such as polyester, polyamide, polypropylene yarn or high-strength yarn made of aramid or polyethylene as well as natural fibers. These materials may be homogeneously incorporated into the tear webbing or they may be processed as a fiber mixture. For example, the fabric straps 2, 3 may comprise polyester or polyamide and the binding yarns 4 may be made of aramid fibers.

The pattern of the binding yarn is shown only schematically in FIG. 2; an actual yarn pattern is shown, for example, in U.S. Pat. No. 3,978,894.

As further shown in FIG. 2, the tear webbing 1 in the region of contact between the two fabric straps 2, 3 along the length $1_T$ in which the tearable connection is made by means of the two binding yarns 4, is, according to the invention, additionally reinforced by a coating matrix 8 of thermoplastic synthetic material. If used at temperatures which range approximately from ambient winter to summer temperatures, the coating matrix 8 is of soft medium elasticity so that the tear webbing 1 can be rolled up, looped, or be deformed in a similar manner without breakage of the coating matrix 8. The coating matrix 8 surrounds the warp yarns 5, 6, the weft yarns 7 and the binding yarns 4 of the tear webbing and fills essentially all intermediate spaces in the woven structure. Due to the coating matrix 8, the tensile strength F required for tearing the strap connection open can be increased up to 40% as compared to uncoated tear webbing 1 of the same dimension and the same weaving technique. The minimum tension forces which result in the tearing of the strap connections can be set from a few Newton to up to several thousand Newton by an appropriate selection of the yarns 4, 5, 6 and 7, the weaving pattern and the coating matrix 8. The degree of absorbable energy resulting from the tearing is equally variable.

The coating is based on a paste which, for example, is made of an emulsion PVC powder which can be worked into a paste, mixed with a softener made of phthalic acid esters. The viscosity of the paste is set from medium to high viscosity by an appropriate selection of the mixing ratio. As an alternative, a paste from a polyurethane and water dispersion could be used to which a common thickener is added for obtaining a paste. The described pastes are known for a simple coating of fabric straps.

A layer of the paste is applied to the tear webbing in the contact region (partial length $1_T$) of the two fabric straps 2, 3 by dipping into the paste of the coating agent. Subsequently, the applied layer is pressed into the woven structure by subjecting it to pressure, for example, by rolling by a pressing roller. Subsequent to the pressing, the tear webbing 1 is heated above the softening temperature of the thermoplastic synthetic material in order to even out the coating in the woven structure and to expel any dispersion agent (water). Subsequently, the thermoplastic synthetic material can elastically harden in a cooling process and can then form the coating matrix 8.

Figure 1:
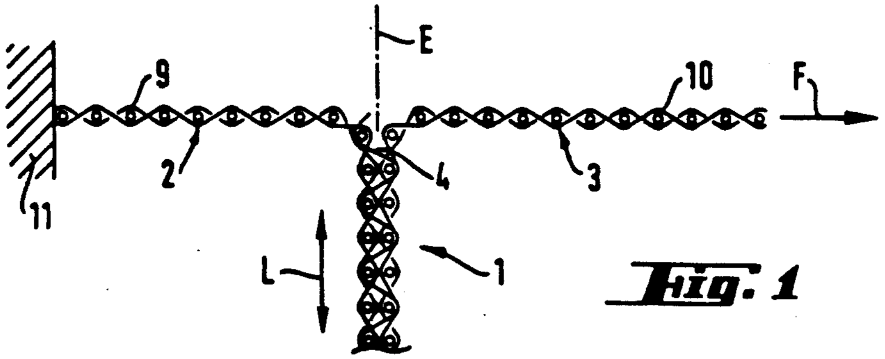
FIG. 1 is a schematic side elevational view of a tear web incorporating the invention and illustrated in use.

An example of use for the tear webbing according to the invention is schematically shown in FIG. 1. Adjoining the interconnected length portion $1_T$, the woven straps 2 and 3 also have separated length portions including strap ends 9 and 10, respectively. One end 9 of the two separated length portions of the tear webbing 1 is stationarily anchored at 11. To the opposite unconnected end 10 a tension force F is applied which is transverse to the plane E of the superposed straps 2, 3. This force may originate, for example, from a person who is caught by a safety harness (not shown) connected to the tear webbing 1 according to the invention. The effect of the sudden impact of the tension force F results in a progressive tearing of the strap connection in the contacting region (partial length $1_T$) of the two fabric straps 2, 3, while the kinetic energy of the falling person is irreversibly absorbed. This results in a gradual, rather than sudden, deceleration.

Figure 3:
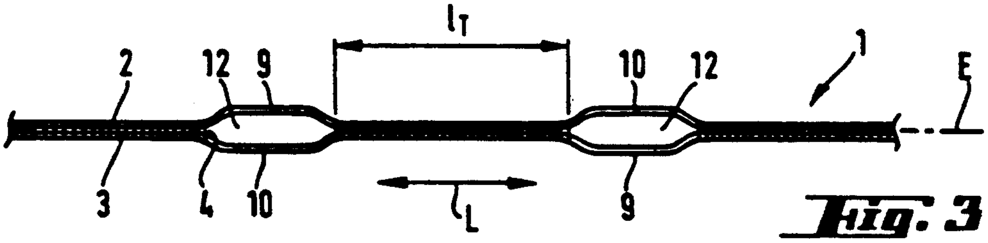
FIG. 3 is a schematic side elevational view of a tear webbing endlessly connected in an intermediate production step according to the invention.

Turning to FIG. 3, the tear webbing 1 is continuously made in a weaving machine. Over a partial length $1_T$ of, for example, 10–50 m, the two fabric straps 2, 3 are connected to one another by means of binding yarns 4. The binding yarn 4 is subsequently omitted over a length of approximately 1 m, resulting in pockets 12. By severing the endless tear webbing 1 at an end of each pocket 12, the two unconnected ends 9, 10 are obtained. Thereafter, the tear webbings 1 are reinforced according to the invention.

It will be understood that the above description of the present invention is susceptible to various modifications, changes and adaptations, and the same are intended to be comprehended within the meaning and range of equivalents of the appended claims.

What is claimed is:

1. In a tear webbing including two woven straps each having a first length portion and an adjoining second length portion; said woven straps being, along said first length portion, in a parallel, superimposed orientation and in a face-to-face engagement with one another; an irreversible energy absorbing device including a binding yarn connecting said woven straps to one another along said first length portion; said woven straps being separate from one another along said second length portion said woven straps being adapted to be exposed, in said second length portion, to pulling forces causing a progressive separation of the woven straps along said first length portion under an irreversible energy absorption effected by a tearing away of the woven straps from the irreversible energy absorbing device; the improvement wherein said irreversible energy absorbing device comprises an elastic coating matrix; said woven straps being at least partially embedded in said coating matrix along said first length portion to thereby increase the resistance of the irreversible energy absorbing device to pulling forces tearing away the woven straps from the irreversible energy absorbing device.

2. A tear webbing as defined in claim 1, wherein said coating matrix includes an elastically hardened thermoplastic.

3. A tear webbing as defined in claim 2, wherein said thermoplastic comprises polyvinyl chloride.

4. A tear webbing as defined in claim 2, wherein said thermoplastic comprises polyurethane.

5. A tear webbing obtained by a process comprising the following steps:

(a) connecting to one another woven straps by a binding yarn in a parallel, superposed, face-to-face engaging orientation along a first length portion thereof;

(b) leaving said woven straps unconnected along a second length portion;

(c) making a mass of pasty consistency, including a thermoplastic;

(d) applying the pasty mass to said woven straps along said first length portion to form a layer thereon;

(e) pressing the pasty mass into the woven straps; and (f) hardening the pasty mass to form an elastically hardened coating matrix at least partially surrounding said woven straps to thereby increase the resistance of the irreversible energy absorbing device to pulling forces tearing away the woven straps from the irreversible energy absorbing device.

6. A tear webbing as defined in claim 6, wherein step (d) includes the step of dipping the tear webbing into the pasty mass.

7. A tear webbing as defined in claim 5, wherein step (e) includes the step of rolling the pasty mass into the woven straps.

8. A tear webbing as defined in claim 5, further comprising the step of heating the tear webbing above the softening temperature of the thermoplastic after step (e) for evening the layer and for expelling any dispersion agent.

9. A tear webbing as defined in claim 5, wherein step (f) includes cooling of the tear webbing.

10. A tear webbing as defined in claim 5, wherein step (c) includes the step of mixing a polyvinyl powder with a softener.

11. A tear webbing as defined in claim 5, wherein step (c) includes the step of mixing a polyurethane/water dispersion with a thickener.

* * * * *